(12) United States Patent  (10) Patent No.: US 7,959,710 B2
Olsen et al.  (45) Date of Patent: Jun. 14, 2011

(54) SYSTEM AND METHOD FOR REMOVING WATER AND SILOXANES FROM GAS

(75) Inventors: Andrew J. Olsen, Amesbury, MA (US); Shaun D. Sullivan, Northwood, NH (US)

(73) Assignee: FlexEnergy Energy Systems, Inc., Irvine, CA (US)

( * ) Notice: Subject to any disclaimer, the term of this patent is extended or adjusted under 35 U.S.C. 154(b) by 25 days.

(21) Appl. No.: 12/648,900

(22) Filed: Dec. 29, 2009

(65) Prior Publication Data

US 2010/0107876 A1  May 6, 2010

Related U.S. Application Data

(62) Division of application No. 11/532,167, filed on Sep. 15, 2006, now Pat. No. 7,645,322.

(51) Int. Cl.
*B01D 53/00* (2006.01)

(52) U.S. Cl. .............. 95/39; 95/271; 95/288; 55/467.1

(58) Field of Classification Search .............. 95/39, 271, 95/288; 55/467.1
See application file for complete search history.

(56) References Cited

U.S. PATENT DOCUMENTS

| | | |
|---|---|---|
| 1,968,655 A | 7/1934 | Rogers |
| 2,870,868 A | 1/1959 | Du Bois Eastman et al. |
| 3,019,097 A | 1/1962 | Ecke et al. |
| 3,393,527 A | 7/1968 | Swenson et al. |
| 3,824,766 A | 7/1974 | Valentine et al. |
| 4,097,250 A | 6/1978 | Pagani et al. |
| 4,272,269 A | 6/1981 | Hammond et al. |
| 4,305,733 A | 12/1981 | Scholz et al. |
| 4,409,102 A | 10/1983 | Tanner |
| 4,657,571 A | 4/1987 | Gazzi |
| 4,681,612 A | 7/1987 | O'Brien et al. |
| 4,738,691 A | 4/1988 | Frey |
| 4,934,146 A | 6/1990 | Wilhelm et al. |
| 5,306,331 A | 4/1994 | Auvil et al. |
| 5,462,583 A | 10/1995 | Wood et al. |
| 5,596,884 A | 1/1997 | Markbreiter et al. |
| 5,681,360 A | 10/1997 | Siwajek et al. |
| 6,539,747 B2 | 4/2003 | Minta et al. |
| 6,712,885 B1 | 3/2004 | Basseen et al. |
| 6,929,680 B2 | 8/2005 | Krushnevych et al. |
| 7,442,239 B2 | 10/2008 | Armstrong et al. |
| 7,645,322 B2 | 1/2010 | Olsen et al. |
| 7,753,975 B2 * | 7/2010 | Wood et al. .................. 55/315.2 |
| 2004/0099138 A1 | 5/2004 | Karode et al. |

FOREIGN PATENT DOCUMENTS

| | | |
|---|---|---|
| DE | 19810993 | 9/1999 |
| GB | 2085310 | 4/1982 |

OTHER PUBLICATIONS

EP07253466.2 Extended Search Report from European Patent Office dated Jan. 7, 2008 (6 pages).

* cited by examiner

*Primary Examiner* — Robert A Hopkins
(74) *Attorney, Agent, or Firm* — McDermott Will & Emery LLP

(57) ABSTRACT

A method of removing siloxanes from a gas that contains siloxanes and water, the method comprising: (a) expanding the gas to cool the gas and freeze at least some of the water in the gas; and (b) removing the siloxanes and frozen water from the expanded and cooled gas. The method may also include compressing the gas prior to expanding it. The step of expanding the gas may include expanding it through a turbine. The method may also include using an energy input mechanism to drive one or both of the compressor or turbine. The ice and siloxanes may be removed from the gas with a cyclonic separator.

12 Claims, 4 Drawing Sheets

US 7,959,710 B2

SYSTEM AND METHOD FOR REMOVING WATER AND SILOXANES FROM GAS

This application is a divisional of U.S. patent application Ser. No. 11/532,167 filed Sep. 15, 2006.

BACKGROUND

The present invention relates to a system for separating water vapor and siloxanes from a gas.

SUMMARY

The invention provides a system for processing gas that contains water vapor and siloxanes, the system comprising: means for expanding the gas to freeze at least some of the water vapor into ice; means for separating the ice and siloxanes from the gas; and means for consuming the gas after removal of the water and siloxanes. In some embodiments, the means for expanding includes a turbine. In some embodiments, the means for separating includes one of a cyclonic separator, a coalescing filter, and a low-velocity plenum. In some embodiments, the means for consuming includes a flare. In some embodiments, the means for consuming includes an engine. In some embodiments, system further comprises a compressor compressing the gas to a pressure of about 90 psig prior to the fuel entering the means for consuming. In some embodiments, the system further comprises a heat exchanger exchanging heat from the gas upstream of the means for expanding to the gas flowing out of the means for separating.

In another embodiment, the invention provides a method for conditioning and consuming gas, the method comprising: (a) receiving wet, dirty gas containing water and siloxanes from a source of gas; (b) expanding the wet, dirty gas to a temperature below the freezing temperature of water to create a flow of gas containing ice; (c) separating ice and siloxanes from the flow of gas containing ice to create a dry, clean flow of gas; and (d) consuming the dry, clean gas in a fuel consuming device. In some embodiments, step (a) includes receiving the wet, dirty gas from a landfill or waste water treatment facility. In some embodiments, the method further comprises, prior to step (b), lowering the temperature of the gas to below the dew point of the gas but above the freezing temperature of water to condense at least some of the water in the gas, and removing at least some of the condensed water. In some embodiments, step (b) is performed with a turbine. In some embodiments, the method further comprising boosting the pressure of the gas to about 90 psig prior to step (d).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, although the illustrated embodiments include specific gas pressure and temperature data, such data is specific to the illustrated embodiments and should not be regarded as limiting the scope of the invention except to the extent specified in the claims.

Figure 1:
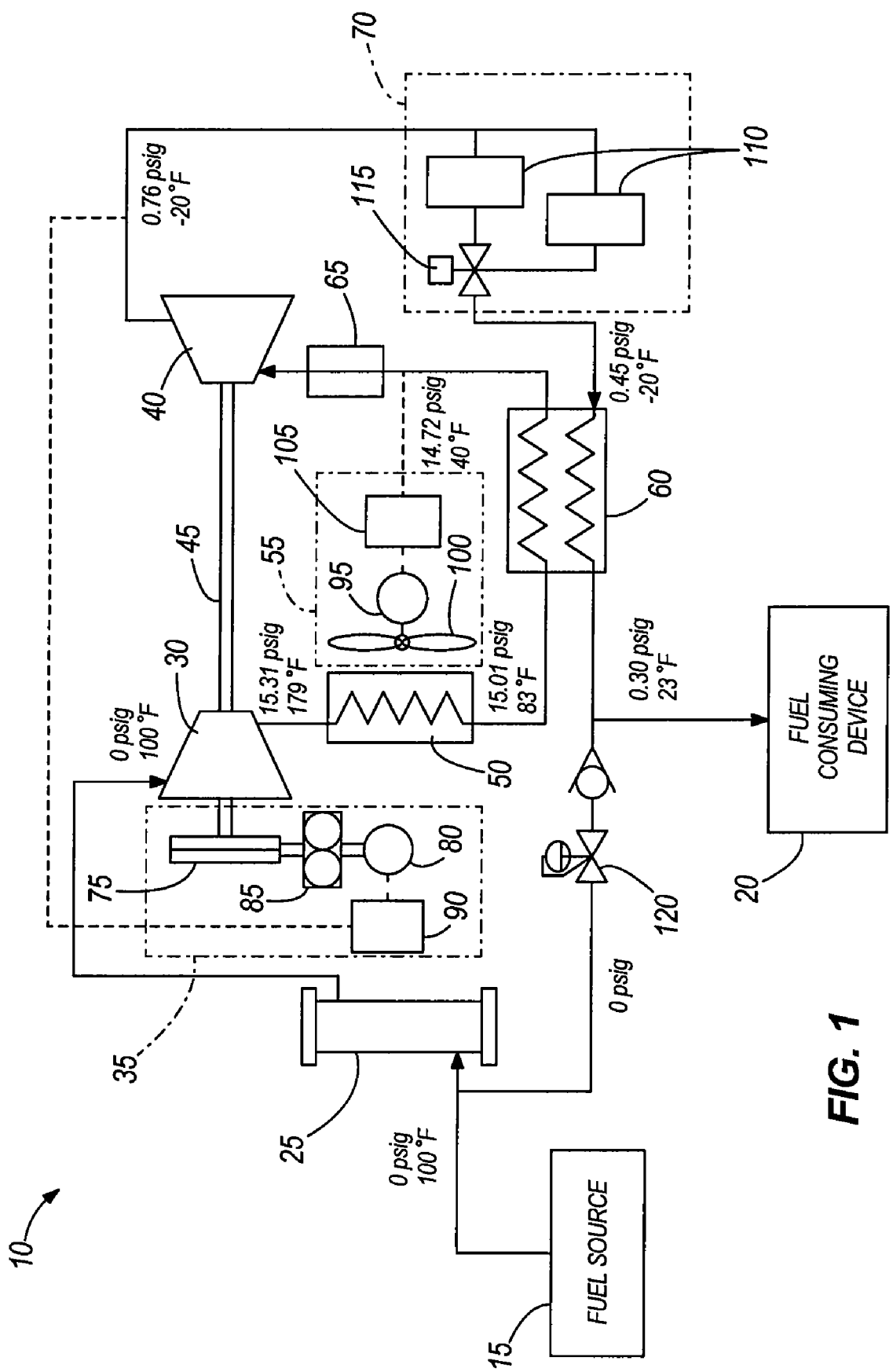
FIG. 1 is a schematic illustration of a first embodiment of a fuel conditioner of the present invention.

FIG. 1 illustrates a fuel conditioning system 10 that receives gas from a fuel source 15, removes water and impurities from the gas, and delivers the gas to a fuel consuming device 20. The system 10 includes a scrubber 25, a compressor 30, an energy input mechanism 35, a turbine 40 coupled for rotation with the compressor 30 by way of a shaft 45, an aftercooler 50, an airflow mechanism 55, an economizer 60, a moisture separator 65, and a solids separator 70.

The fuel source 15 may be, for example, a waste water treatment facility, landfill, or other site from which gas is extracted. The impurities in the gas may be, for example, siloxanes or other contaminants that would cause pollution or damage to a combustion chamber and associated moving parts if not removed from the gas. The fuel consuming device 20 may be, for example, a flare that burns the gas to reduce the amount of unburned hydrocarbons that are released into the environment. Alternatively, the fuel consuming device may be an engine that uses the gas fuel for doing work. Examples of such engines include reciprocating engines, microturbine engines, and larger gas turbine engines. Examples of work done by such engines include production of electricity, driving chillers, refrigerators, or compressors, cogeneration of hot water, and raising, lowering, or otherwise moving objects.

In a typical waste water treatment facility or landfill, gas is extracted from the site at about 0 psig and 100° F., which is the pressure and temperature at which certain reactions take place in a gas digester at the facility. In some cases, the temperature and pressure of the gas will vary depending on the type of reaction taking place. The gas is fed into the scrubber 25, which removes water droplets that are entrained in the gas. The gas is 100% saturated (e.g., at its dewpoint) at the outlet of the scrubber 25. The saturated gas flows into the compressor 30, in which the pressure of the gas is raised to about 15 psig and the temperature is raised to 179° F. In this regard, the compressor 30 energizes the gas prior to the gas entering the turbine 40. In other embodiments, the gas can be energized by different means, such as a blower.

The inherent inefficiencies of the compressor-turbine assembly require additional work to make the fuel conditioning system 10 function. This additional energy is provided by the energy input mechanism 35, which may also be used to start the process. The illustrated energy input mechanism 35 includes a Pelton wheel 75 mounted for rotation with the compressor 30 (e.g., on the shaft 45), an electric motor 80, an oil compressor 85, and a variable frequency drive control system 90. The variable frequency drive control system 90 senses a parameter within the fuel conditioning system 10 and adjusts the speed of the motor 80 to maintain the parameter within a desired range. The measured parameter may be, for example, the pressure, temperature, or volumetric flow of the gas at the inlet or outlet of the turbine 40, or some other parameter that is indicative (i.e., from which can be calculated or inferred) the temperature of the gas. The motor 80 drives the oil compressor 85, which in turn causes a flow of oil to impinge upon the Pelton wheel 75 to cause rotation of the Pelton wheel 75 and compressor 30. In the illustrated embodiment, the control system 90 controls the motor 80 to maintain a turbine outlet temperature of about −20° F.

In alternative embodiments, the compressor 30 and turbine 40 may not be coupled for rotation together and the energy input mechanism 35 may only drive rotation of one of them. For example, if the energy input mechanism 35 drives rotation of the compressor 30 only, the energy in the compressed gas will cause rotation of the turbine 40. In other embodiments, a pre-compressor (driven by an energy input mechanism) may be positioned upstream of the compressor 30 to provide sufficient energy to the flow of gas to drive rotation of the compressor/turbine assembly, in which case the compressor/turbine assembly may be free-spinning. In other embodiments, the energy input mechanism 35 may include an electric motor 80 directly driving the compressor 30 or driving the compressor 30 through a magnetic coupling. The energy input mechanism 35 may take on many other forms in other embodiments, provided that the energy input mechanism 35 provides energy to perform work.

From the compressor 30, the gas flows through the aftercooler 50, which in the illustrated embodiment utilizes a flow of air to cool the compressed gas. The flow of air is supplied by the airflow mechanism 55. In the illustrated embodiment, the airflow mechanism 55 includes a motor 95, a fan 100, and a variable frequency drive control system 105. The variable frequency drive control system 105 controls the speed of operation of the motor 95 and fan 100 to maintain another parameter within a desired range. In the illustrated embodiment, for example, the variable frequency drive control system 105 attempts to maintain the gas temperature at the outlet of the economizer 60 at around 40° F. There will be some pressure drop in the gas as it flows through the aftercooler 50, and the pressure in the illustrated embodiment will be around 15.01 psig at the aftercooler outlet. The temperature of the gas upon exiting the aftercooler is about 83° F. In other embodiments, a temperature-controlled mixing valve can be used in place of the variable frequency drive control system 105.

Then the gas flows through the economizer 60, which in the illustrated embodiment is a counterflow heat exchanger that cools the gas about to enter the turbine 40 (the "inflowing gas") while warming the gas leaving the solids separator 70 (the "outflowing gas"). The economizer 60 may be, for example, a plate-fin heat exchanger that permits heat to flow from the relatively hot inflowing gas to the relatively cold outflowing gas without mixing the gas flows. As mentioned above, the airflow mechanism 55 is controlled to create a gas temperature of about 40° F. at the outlet of the economizer 60. A slight pressure drop across the economizer 60 will drop the gas pressure to around 14.72 psig.

In alternative embodiments, the aftercooler 50 or the economizer 60 or both may be replaced with a refrigeration system that cools the gas temperature to the temperatures described above.

Prior to flowing into the turbine 40, the gas flows through the moisture separator 65. The moisture separator 65 removes any droplets of water that have formed within the gas as a result of condensation during the reduction of the gas temperature through the aftercooler 50 and economizer 60. Because the gas temperature has been maintained above the freezing temperature of water (such temperature referred to herein as "freezing" for simplicity) to this point, there should not be significant ice or frost buildup within the aftercooler 50 and economizer 60. The aftercooler 50 and economizer 60 are helpful, however, in reducing the gas temperature to slightly above freezing so that the temperature reduction that results from expansion through the turbine 40 drops the gas temperature well below freezing.

For embodiments in which a relatively large turbine 40 is used, the pressure of the gas may be reduced in an optional expander prior to the gas entering the turbine 40, such that the gas pressure is within a range that matches the turbine size. Examples of relatively large turbines for this application include the Garrett Corporation models GT1241 and GT1544, which are sized for small displacement applications, including motorcycles. These relatively large turbines are suitable for a pressure drop of about 7 to 15 psig as contemplated in the embodiments of FIGS. 1 and 2. Relatively small turbines for this application, such as those used in dental equipment, may be more appropriate for high pressure applications.

The gas next flows through the turbine 40, which rotates with the compressor 30 under the influence of the energy input mechanism 35. As the gas expands through the rotating turbine 40, its temperature drops to about −20° F. and its pressure drops to about 0.76 psig. This causes remaining water in the gas to condense and freeze, which results in a flow of gas and ice at the outlet of the turbine 40. Conventional heat exchangers rely on contact between air and large cooling surfaces to transfer heat. When gas having moisture content is passed through such conventional heat exchangers and the temperature is dropped below freezing, such conventional heat exchangers are prone to freezing up and becoming fouled with ice because of such contact, reducing the effectiveness of the heat exchanger. The expanding turbine of the present invention cools through expansion of the gas, not heat transfer across surfaces, which greatly reduces the incidence of ice fouling. Additionally, the turbine 40 in the illustrated embodiment rotates at a rate of between about 40,000 and 100,000 or higher rpm, depending on the size of the turbine 40, and such high rate of rotation naturally sheds most ice that may form. To further inhibit the formation of ice in the illustrated turbine 40, the temperature of oil lubricating the turbine 40 bearings can be adjusted to maintain warmer turbine blade temperatures and keep the material of the turbine blade at temperature above the temperature of the gas flowing through the turbine 40. In alternative embodiments, the turbine 40 may be replaced with an air motor, a gear pump, a vane pump, a nozzle (e.g., a Joule-Thompson valve), or another mechanism for indirectly cooling the gas through expansion without substantial contact of the gas on the mechanism.

The gas and ice flows into the solids separator 70, in which the ice is separated from the gas. As the vapor pressure and temperature of the gas drops in the turbine 40, siloxanes nucleate around the water and ice. Siloxanes are thus removed with the ice in the separator 70. The gas flowing out of the solids separator 70 (i.e., the above-mentioned outflowing gas) is therefore dry and clean, is still at a temperature of about −20° F., and is at a pressure of about 0.45 psig (owing to a pressure drop through the solids separator 70). In the illustrated embodiment, the solids separator 70 includes two separators 110 so that if one separator 110 is fouled with ice, a valve 115 may be actuated to direct the flow to the other separator 110 while the fouled separator 110 is thawed. In one embodiment, the solids separator 70 takes the form of a cyclonic separator, and in other embodiments it may be a coalescer filter or a low-velocity plenum.

The outflowing gas then flows through the economizer 60 to pre-cool the inflowing gas. This increases the temperature of the outflowing gas to about 23° F., and decreases the gas pressure to about 0.30 psig. Raising the outflowing gas temperature through the economizer 60 ensures that the gas will be above its dewpoint, thereby creating dewpoint suppression. Although the outflowing gas should be completely dry upon leaving the separator 70, the dewpoint suppression reduces the likelihood that any remaining water will condense in the gas while it is being consumed in the fuel consuming device 20. From the economizer 60, the gas flows into the fuel consuming device 20, or is directed back (via a valve 120) to mix with and cool the wet, dirty gas as it flows into the scrubber 25.

Figure 2:
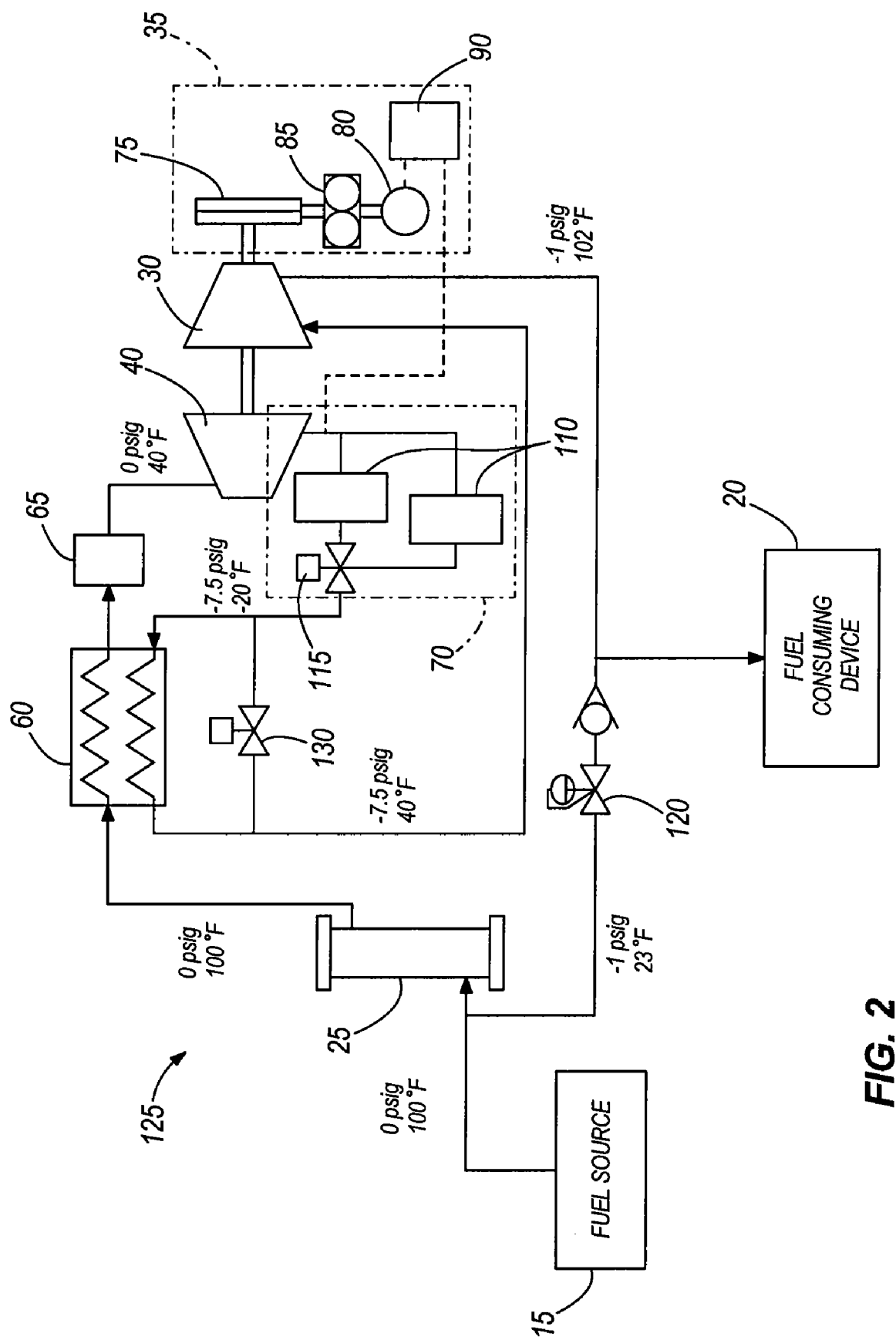
FIG. 2 is a schematic illustration of a second embodiment of a fuel conditioner of the present invention.

FIG. 2 schematically illustrates an alternative construction 125 of the fuel conditioning system, in which like components are identified with the same reference numerals used in FIG. 1. In this embodiment, there is no aftercooler 50. The gas flowing out of the scrubber 25 is first run through the economizer 60 to reduce its temperature to about 40° F. A bypass valve 130 controls the amount of gas flowing into the cold side of the economizer 60 to ensure that the gas flowing out of the economizer is kept above freezing. Condensed water within the gas is then removed in the moisture separator 65. Then the gas flows through the turbine 40, in which the gas pressure is reduced to −7.5 psig and the gas temperature is reduced to −20° F. Then the gas flows through the solids separator 70 to remove ice and siloxanes. The gas then flows through the economizer 60, where its temperature is raised to about 40° F. Finally, the gas flows through the compressor 30, where the gas pressure is raised to about −1 psig and the gas temperature is raised to about 102° F. The compressor 30 is driven by an energy input mechanism 35 similar to the first embodiment.

Figure 3:
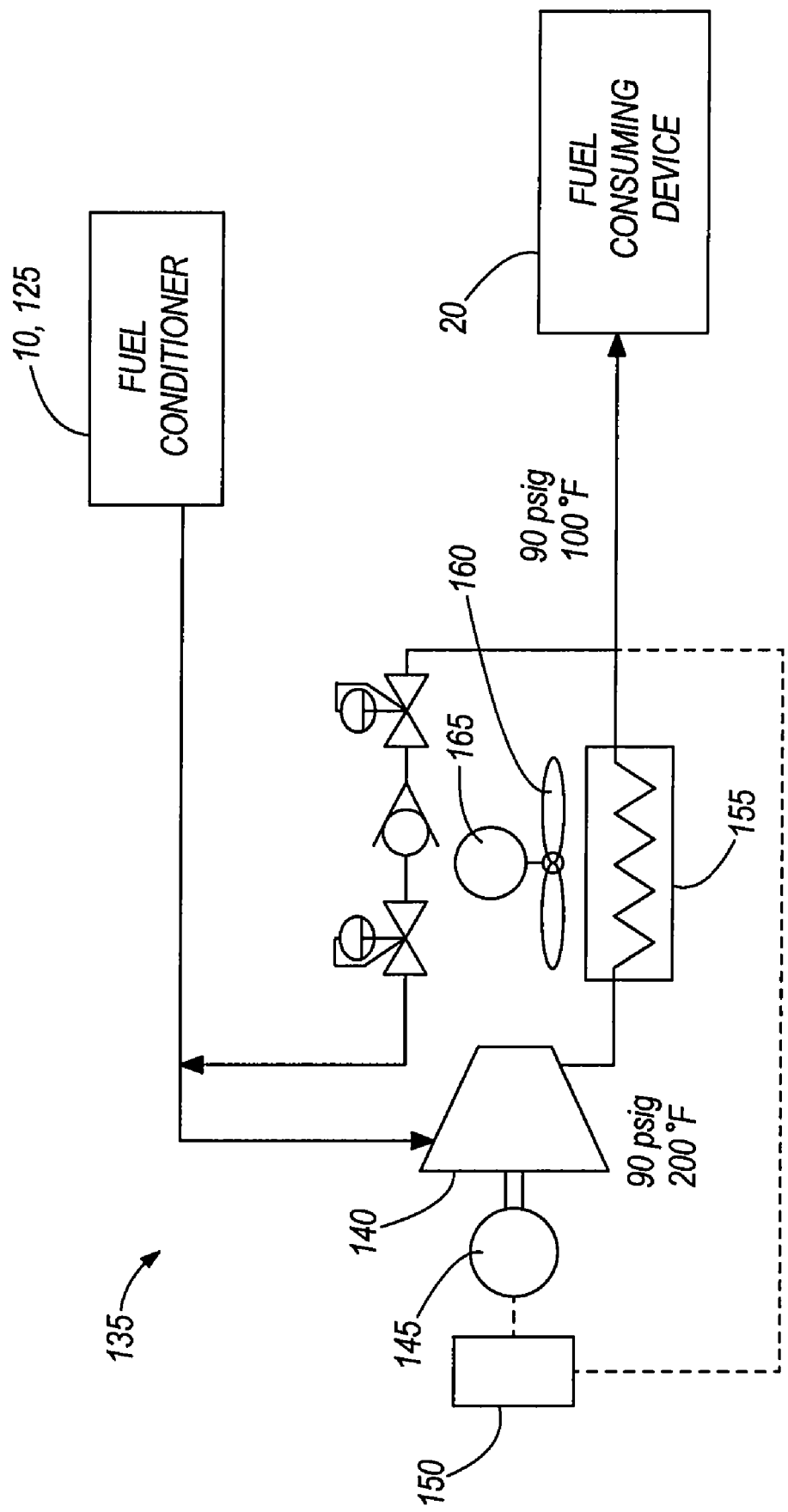
FIG. 3 is a schematic illustration of an optional fuel booster.

With reference to FIG. 3, some fuel consuming devices 20, such as microturbine engine generators, operate most efficiently if the fuel gas is provided at elevated pressures (e.g., around 90 psig). Should the fuel consuming device 20 require relatively high-pressure fuel gas, an optional compressor or gas booster assembly 135 may be used to raise the gas pressure upstream of the fuel consuming device 20. The illustrated optional compressor assembly 135 includes a compressor 140 driven by a motor 145 and a variable frequency drive control system 150 that is referenced to a parameter (e.g., gas pressure) of the gas entering the compressor assembly 135. In the compressor 140, the gas pressure is raised to about 90 psig and the gas temperature is raised to about 200° F. Also within the compressor assembly 135 is an aftercooler 155 that reduces the gas temperature to about 100° F. A fan 160 powered by a motor 165 blows air across the aftercooler 155 to facilitate heat transfer. In other embodiments, the gas booster 135 can be positioned upstream of the fuel conditioning system 10 such that relatively high pressure gas enters the system 10. In such embodiments the boosted gas may provide sufficient energy to drive the compressor 30 and turbine 40 in the fuel conditioning system 10, which would obviate the energy input mechanism 35. For that matter, in a closed system, positioning the gas booster 135 downstream of the fuel conditioning system 10 may augment the expansion ratio across the turbine 40 of the fuel conditioning system 10, and this may also obviate the energy input mechanism 35.

Figure 4:
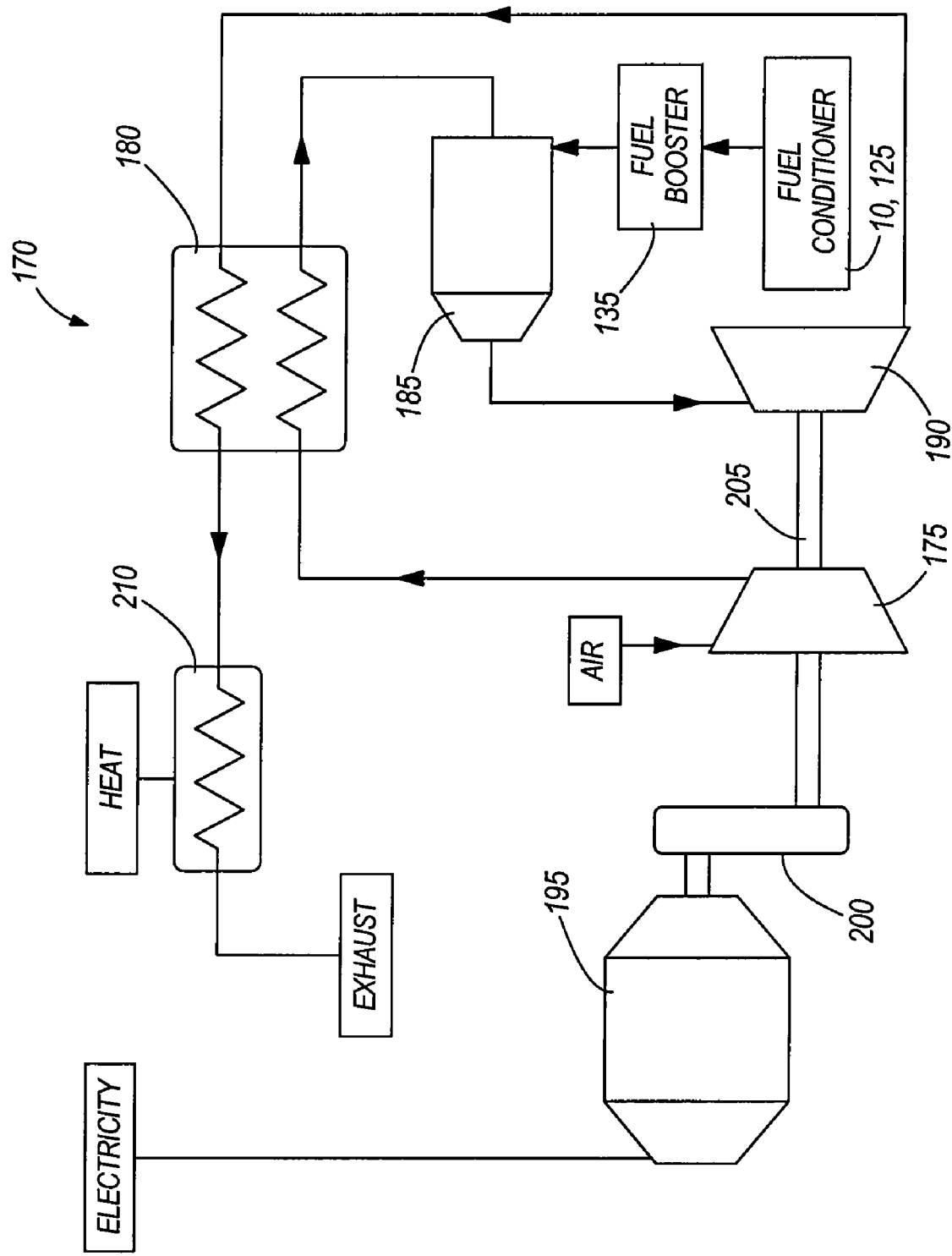
FIG. 4 is a schematic illustration of a microturbine engine generator system for use with the present invention.

FIG. 4 schematically illustrates one type of fuel consuming device 20 that may be used in conjunction with either of the fuel conditioning systems 10, 125 described above and illustrated in FIGS. 1 and 2. The fuel consuming device in FIG. 3 is a microturbine engine generator 170, which is useful in distributed power applications, and can even be mounted on skids and moved between job sites. Microturbine engine generators usually generate 2 MW of power or less, and are therefore relatively small when compared to power generators in power plants that are on the grid.

The illustrated microturbine engine generator 170 includes a compressor 175, a recuperator 180, a combustor 185, a power turbine 190, and an electric power generator 195. Air is compressed in the compressor 175 and delivered to a cool side of the recuperator 180. The recuperator 180 may be, for example, a counterflow plate-fin type heat exchanger. The compressed air is preheated within the recuperator 180 and mixed with a gaseous fuel from a fuel supply (e.g., one of the fuel conditioning systems 10, 125 described above and illustrated in FIGS. 1 and 2) to create a combustible mixture. It is advantageous in a microturbine engine generator 170 to raise the pressure of fuel gas used in the combustible mixture to 90 psig, and the temperature to about 100° F. For such applications, the above-mentioned compressor assembly 135 may be positioned downstream of the fuel conditioning system 10, 125 and upstream of the microturbine engine generator 170.

The combustible mixture is combusted in the combustor 185 to create products of combustion. The products of combustion are then permitted to expand through the power turbine 190 to impart rotational energy to the power turbine 190. Rotation of the power turbine 190 drives operation of the electric generator 195 through an optional gearbox 200 to produce electrical power at a useful frequency. In other embodiments, the power electronics may be used in place of the gearbox to condition the electrical signal into a useful frequency. In the illustrated microturbine 170, the power turbine 190 and compressor 175 are coupled for rotation together via a shaft 205, so rotation of the power turbine 190 also drives rotation of the compressor 175. In other embodiments, the power turbine 190 may only drive the power generator 195, and an additional gasifier turbine may be used to drive the compressor 175. In such embodiments, the products of combustion are expanded through both the power turbine 190 and the gasifier turbine. Prior to exhausting the products of combustion from the microturbine engine 170, they flow into a hot side of the recuperator 180 to preheat the inflowing compressed air. Any remaining heat in the products of combustion is used for some other useful purpose (e.g., heating water) in a final heat exchanger 210 before the products of combustion are exhausted.

Various features and advantages of the invention are set forth in the following claims.

What is claimed is:

1. A system for processing gas that contains water vapor and siloxanes, the system comprising:
   means for expanding the gas to freeze at least some of the water vapor into ice;
   means for separating the ice and siloxanes from the gas; and
   means for consuming the gas after removal of the water and siloxanes.

2. The system of claim 1, wherein the means for expanding includes a turbine.

3. The system of claim 1, wherein the means for separating includes one of a cyclonic separator, a coalescing filter, and a low-velocity plenum.

4. The system of claim 1, wherein the means for consuming includes a flare.

5. The system of claim 1, wherein the means for consuming includes an engine.

6. The system of claim 1, further comprising a compressor compressing the gas to a pressure of about 90 psig prior to the fuel entering the means for consuming.

7. The system of claim 1, further comprising a heat exchanger exchanging heat from the gas upstream of the means for expanding to the gas flowing out of the means for separating.

8. A method for conditioning and consuming gas, the method comprising:
  (a) receiving wet, dirty gas containing water and siloxanes from a source of gas;
  (b) expanding the wet, dirty gas to a temperature below the freezing temperature of water to create a flow of gas containing ice;
  (c) separating ice and siloxanes from the flow of gas containing ice to create a dry, clean flow of gas; and
  (d) consuming the dry, clean gas in a fuel consuming device.

9. The method of claim 8, wherein step (a) includes receiving the wet, dirty gas from a landfill or waste water treatment facility.

10. The method of claim 8, further comprising, prior to step (b), lowering the temperature of the gas to below the dew point of the gas but above the freezing temperature of water to condense at least some of the water in the gas, and removing at least some of the condensed water.

11. The method of claim 8, wherein step (b) is performed with a turbine.

12. The method of claim 8, further comprising boosting the pressure of the gas to about 90 psig prior to step (d).

* * * * *